(12) United States Patent
Heo

(10) Patent No.: US 8,026,191 B2
(45) Date of Patent: Sep. 27, 2011

(54) CARBON-CONTAINING REFRACTORY COMPOSITION CONTAINING NO RESINOUS BINDER

(75) Inventor: Jeong Heo, Busan (KR)

(73) Assignee: Wonjin Worldwide Co., Ltd. (KR)

( * ) Notice: Subject to any disclaimer, the term of this patent is extended or adjusted under 35 U.S.C. 154(b) by 711 days.

(21) Appl. No.: 11/813,648

(22) PCT Filed: May 8, 2007

(86) PCT No.: PCT/KR2007/002260
§ 371 (c)(1), (2), (4) Date: Jul. 10, 2007

(87) PCT Pub. No.: WO2008/091041
PCT Pub. Date: Jul. 31, 2008

(65) Prior Publication Data
US 2009/0233783 A1    Sep. 17, 2009

(30) Foreign Application Priority Data

Jan. 26, 2007   (KR) ........................ 10-2007-0008470

(51) Int. Cl.
*C04B 35/52*   (2006.01)
*C04B 35/03*   (2006.01)
*C04B 35/04*   (2006.01)

(52) U.S. Cl. ............. 501/101; 501/94; 501/99; 501/109

(58) Field of Classification Search ............. 501/94–133
See application file for complete search history.

(56) References Cited

U.S. PATENT DOCUMENTS

| 3,019,084 A | * | 1/1962 | Amstein ........................ 423/297 |
| 4,233,079 A |   | 11/1980 | Rechter |
| 4,976,977 A | * | 12/1990 | Johnson et al. .................. 426/96 |
| 6,136,227 A | * | 10/2000 | Yamamura et al. ........ 252/363.5 |
| 2004/0055510 A1 | * | 3/2004 | Kurple et al. .................. 106/640 |

FOREIGN PATENT DOCUMENTS

| JP | 10-212559 | 8/1998 |
| KR | 1999-0040398 | 4/2002 |
| WO | WO 2005061411 A1 * | 7/2005 |

* cited by examiner

*Primary Examiner* — Melvin Mayes
*Assistant Examiner* — Kevin Johnson
(74) *Attorney, Agent, or Firm* — Baker & Hostetler LLP

(57) ABSTRACT

The present invention provides a carbon-containing refractory composition comprising a carbon-containing refractory matrix material, and a binder selected from molasses, lignosulphonate, magnesium sulfate, magnesium chloride, and a mixture thereof. The inventive composition having satisfactory good thermal and physical properties causes no environmental hazard.

8 Claims, No Drawings

CARBON-CONTAINING REFRACTORY COMPOSITION CONTAINING NO RESINOUS BINDER

TECHNICAL FIELD

The present invention relates to a carbon-containing refractory composition containing no resinous binder, and thus having no environmental harmfulness as well as excellent properties.

BACKGROUND ART

Carbon-containing refractories have been widely used in various high-temperature processes including steel and iron making processes. A typical composition for forming a carbon-containing refractory comprises a carbon-containing refractory matrix material and a binder, and a phenolic resin has been conventionally used as the binder due to good compatibility, dispersability, press-moldability, strength, and high residual carbon after firing.

However, the phenolic resin binder has a serious disadvantage in that it releases harmful decomposition gases including benzene, toluene, phenol and xylenol when heat-treated or fired at a high temperature.

In order to solve such environmental pollution, U.S. Pat. No. 6,136,227 suggested a carbon-containing refractory composition comprising saccharified starch and/or reduced saccharified starch as a binder. However, this composition has the disadvantage that saccharified starch and/or reduced saccharified starch leads to refractories having poor thermal properties and corrosion resistance.

DISCLOSURE OF INVENTION

Technical Problem

It is, therefore, an object of the present invention to provide a novel carbon-containing eco-friendly refractory composition having good physical properties.

Technical Solution

In accordance with the present invention, there is provided a carbon-containing refractory composition comprising a carbon-containing refractory matrix material, and a binder selected from molasses; magnesium sulfate or magnesium chloride; lignosulphonate; and a mixture thereof.

BEST MODE FOR CARRYING OUT THE INVENTION

A carbon-containing refractory composition generally employs a binder to impart the plasticity, the stickiness and the high-filling property to the refractory composition upon press-molding of the composition.

The inventive carbon-containing refractory composition is characterized in that molasses, magnesium sulfate or magnesium chloride, lignosulphonate, or a mixture thereof is used as a binder, instead of a conventional resinous binder such as a phenolic resin.

In the inventive carbon-containing refractory composition, the above binder components may be employed alone or in combination thereof, and the total binder content may range from 1 to 10% by weight based on the carbon-containing refractory matrix material.

Specifically, molasses used in the inventive composition is a commercially available sticky liquid which may be obtained in the course of purification of sucrose from sugar cane or sugar beet. Molasses can significantly enhance the thermal properties and the corrosion resistance of the refractory produced. In the present invention, molasses preferably has a viscosity ranging from 2,000 to 30,000 centipoises (cp). When the viscosity is less than the lower limit, the press-moldability becomes poor, whereas when the viscosity is exceedingly high, agglomerization occurs in the refractory composition.

Lignosulphonate, magnesium sulfate, and magnesium chloride may be used in the form of a powder or a solution dissolved in a suitable solvent. When they are used in the form of a powder, a suitable solvent is preferably introduced into the composition after the introduction of the powder. The suitable solvent may be water, or non-aqueous solvent such as an alcohol (e.g., methanol), or sorbitol, or a mixture thereof, and the concentration of the binder component in the solution may range from 5 to 80 wt %.

It may be preferred to use the binder components in a combination of the powder form and the solution form for the balanced enhancement in the plasticity, the adhesiveness and the strength of the composition, and at this time, the preferred amount of the powder form introduced may be 2% by weight or less based on the total composition.

Further, the binder components may be preferably used in a mixture of an organic component such as molasses and lignosulphonate with an inorganic component such as magnesium sulfate and magnesium chloride, in order to provide a high binding property after drying and firing of the composition. The mix ratio of the organic and inorganic binder mixture ranges from 2:8 to 8:2 by weight.

The inventive composition may further comprise an additional binder component such as saccharified starch or reduced saccharified starch or others conventionally known in the art in order to improve the compatibility, press-moldability and strength of the composition. The additional binder component may be employed in an amount not affecting the effect of the present invention. The binder may be described as comprising up to 50% by weight saccharified starch or reduced saccharified starch and the remainder comprising the organic and inorganic components previously discussed. The saccharified starch or reduced saccharified starch may be used in an amount of 20 to 50% by weight based on the total weight of the binder components used.

The carbon-containing refractory matrix material used in the inventive carbon-containing refractory composition may be conventional materials known in the art. For example, the carbon-containing refractory matrix material may be selected from the group consisting of magnesia-carbon based, magnesia-alumina-carbon based, alumina-magnesia-carbon based, alumina-silicon carbide-carbon based, and alumina-carbon based materials, and a mixture thereof.

Magnesia may include electrofused magnesia, sea water magnesia, or fired magnesia. The carbon component may be selected from various types of crystalline or amorphous graphite, and in order to inhibit the oxidation of the carbon component, a metal powder such as aluminum silicon, and magnesium-aluminum alloy may be used together with the carbon component. The alumina component may be white electrofused alumina, white fired alumina, brown electrofused alumina, or bauxite. Silicon carbide is used to enhance the thermal strength and the anti-oxidation of the alumina component used.

Particularly, when the content of the carbon component, e.g., graphite, particularly flaky graphite, of the carbon-containing refractory matrix material is higher than 10% by weight, a mixed form of the organic and inorganic binder components may be preferably used to enhance the moldability of the composition.

Further, in order to improve the thermal spalling resistance, preferably the inventive composition may comprise an additional carbon powder having a high surface area such as expanded graphite or nanocarbon as a part of the carbon component contained in the refractory matrix material. The expanded graphite suitably has a bulk density of about 0.1 g/cm$^3$ or less, and the nanocarbon (e.g., nanosized carbon black, nanotube, etc) may have a particle size of about 50 nm or less, and typically has a bulk density of about 0.16 to 0.47 g/cm$^3$. The additional carbon may be employed in an amount ranging from 0.5 to 10% by weight based on the refractory matrix material. The total carbon content of the carbon-containing refractory composition may be in the range of 2 to 25% by weight, suitably 5 to 20% by weight.

The inventive carbon-containing refractory composition may be used in fabricating various refractories such as bricks, e.g., unfired bricks and reduction-fired bricks. For instance, the reduction-fired bricks are fabricated by press-molding the inventive carbon-containing refractory composition in the shape of bricks, drying the press-molded bricks at a temperature of 60 to 135° C. and firing the dried bricks at a temperature of 1,000 to 1,500° C. under a reducing atmosphere. The unfired bricks may be obtained by drying the press-molded bricks at a temperature of 600° C. or less.

The bricks obtained from the inventive carbon-containing refractory composition satisfy the required properties of refractories, e.g., cold crushing strength, apparent porosity, corrosion resistance, thermal spalling resistance and other properties after dried and fired, while generating no hazardous materials to environment.

The binder components used in the inventive carbon-containing refractory composition have better compounding property than that of a phenolic resin used in the prior art. That is, the inventive composition requires a compounding time of about 5 minutes, which is markedly shorter than 15 to 40 minutes of the conventional refractory composition comprising the phenolic binder. Further, the inventive composition can be press-molded immediately after the compounding step, while the conventional refractory composition requires an aging time of about 3 to 24 hours. In terms of the drying time, the inventive composition can be dried within about 12 hours or less, whereas the conventional composition requires about 24 hours for drying. Accordingly, the inventive composition has the benefits of productivity and energy economy.

The present invention is further described and illustrated in Examples provided below, which are, however, not intended to limit the scope of the present invention.

In the Examples, the flaky graphite used has a bulk density of 0.98 g/cm$^3$, a specific surface area of 1 m$^2$/g, and an average particle size of 350 μm, and the expanded graphite used has a bulk density of 0.09 g/cm$^3$, a specific surface area of 16.9 m$^2$/g, and an average particle size of 188.4 μm.

In the Examples, the physical properties were measured as follows:

1) Cold Crushing Strength (kg/cm$^2$)

A dried or reduction-fired brick specimen having a size of 60 mm×60 mm×60 mm was tested with a hydraulic cold crushing strength tester according to KS L 3115.

2) Corrosion Resistance

The corrosion resistance of a reduction-fired brick specimen was tested with a rotational corrosion tester using oxygen and LPG (liquefied petroleum gas) as a fuel in a burner at 1,650 to 1,700° C. and using a 1:1 (w/w) mixture of steel and a steel-making slag as a corrosion agent. The corrosion resistance is represented by a relative corrosion index based on a base specimen. The lower the value of the corrosion index is, the better the corrosion resistance is.

3) Thermal Spalling Resistance

A reduction-fired brick specimen having a size of 230 mm×40 mm×40 mm was immersed in molten steel at 1,650° C. for 60 seconds using a high frequency wave induced furnace and then cooled in air for 5 minutes (1 cycle). The above procedure was repeated, and the number of cycles at the time that the specimens underwent spalling was reported. The higher the number of the cycles measured is, the better the thermal spalling resistance is.

Examples 1-1 to 1-6 and Comparative Examples 1-1 and 1-2

Various brick (AMC based or ASC based (Example 1-4 only)) compositions were prepared using the components represented in Table 1.

Each brick composition was press-molded under a pressure of 2,000 kg/cm$^3$ to obtain a brick specimen, which was dried at 200° C. for 24 hours and the dried specimen was tested for the bulk density, the apparent porosity, and the cold crushing strength. Thereafter, the dried specimen was fired under a reducing atmosphere at 1,000° C. for 3 hours, and the reduction-fired brick specimen was tested for the bulk density, the apparent porosity, the cold crushing strength, the corrosion resistance and thermal spalling resistance.

The test results are shown in Table 1.

TABLE 1

|  |  | Examples |  |  |  |  |  | Comparative Examples |  |
|---|---|---|---|---|---|---|---|---|---|
|  |  | 1-1 | 1-2 | 1-3 | 1-4 | 1-5 | 1-6 | 1-1 | 1-2 |
| Brown Electrofused Alumina | 5 to −0.074 mm | 77 | 67.5 | 42.5 | 76.5 | 60 | 67.5 | 67.5 | 67.5 |
| Bauxite | 5-0 mm | — | — | 25 | — | — | — | — | — |
| Electrofused Magnesia | 5 to −0.074 mm | 15 | 20 | 20 | 3 | 25 | 20 | 20 | 20 |
| Silicon carbide | Fine Powder | — | — | — | 8 | — | — | — | — |
| Flaky Graphite | 96% | 6 | 10 | 10 | 10 | 12 | 10 | 10 | 10 |
| Metal Al | Fine Powder | 1 | 1.5 | 1.5 | 1.5 | 2 | 1.5 | 1.5 | 1.5 |
| Metal Si | Fine Powder | 1 | 1 | 1 | 1 | 1 | 1 | 1 | 1 |
| Eco-friendly Binder | Molasses | 3 | 3 | 3 | 3 | 3 | 1.5 | — | — |
|  | Magnesium Sulfate (30 wt % in water) | — | — | — | — | — | 1.5 | — | — |
|  | Saccharified Starch (60 wt % in water) | — | — | — | — | — | — | — | 3 |
| Phenolic Resin | Liquid Resol | — | — | — | — | — | — | 3 | — |
| Properties after dry (200° C. × 24 hrs) | Bulk Density (g/cm3) | 3.22 | 3.16 | 3.05 | 3.09 | 3.12 | 3.14 | 3.15 | 3.16 |
|  | Apparent Porosity (%) | 7.1 | 6.7 | 8.9 | 6.9 | 6.3 | 6.9 | 6.5 | 6.7 |
|  | Cold Crushing Strength (Kg/cm2) | 568 | 445 | 435 | 415 | 386 | 431 | 452 | 432 |

TABLE 1-continued

|  |  | Examples | | | | | | Comparative Examples | |
|---|---|---|---|---|---|---|---|---|---|
|  |  | 1-1 | 1-2 | 1-3 | 1-4 | 1-5 | 1-6 | 1-1 | 1-2 |
| Properties after firing (1000° C. × 3 hrs) | Bulk Density (g/cm3) | 3.11 | 3.07 | 2.96 | 2.98 | 3.1 | 3.03 | 3.05 | 3.04 |
|  | Apparent Porosity (%) | 12.3 | 11.8 | 13.5 | 11.5 | 11.3 | 12.1 | 11.5 | 12.5 |
|  | Cold Crushing Strength (Kg/cm2) | 318 | 208 | 211 | 215 | 159 | 201 | 205 | 151 |
| Corrosion Resistance | Corrosion Index | 121 | 95 | 137 | 118 | 89 | 98 | 100 | 115 |

From Table 1, it can be seen that with the same amounts of flaky graphite and the same refractory raw materials, the inventive refractory compositions comprising molasses or its mixture with magnesium sulfate have drying/reduction-firing properties and corrosion resistance comparable to or better than those of the refractory compositions comprising the phenolic resin, from the comparison of Examples 1-2 and 1-6 with Comparative Example 1-1. The strength and corrosion resistance of refractory compositions comprising saccharified starch according to the prior art (Comparative Example 1-2) are inferior to those of the compositions comprising the phenolic resin and the inventive compositions.

Examples 2-1 to 2-9 and Comparative Examples 2-1 to 2-5

Various brick (MgO-C based) compositions were prepared as shown in Table 2.

Each brick composition was press-molded to obtain a brick specimen, which was subjected to the procedure of Examples 1-1 to 1-6. The test results are shown in Table 2.

TABLE 2

|  |  | Examples | | | | | | | | |
|---|---|---|---|---|---|---|---|---|---|---|
|  |  | 2-1 | 2-2 | 2-3 | 2-4 | 2-5 | 2-6 | 2-7 | 2-8 | 2-9 |
| Electrofused Magnesia | 5 to −0.074 mm | 89 | 84.5 | 81 | 77 | 84.5 | 81 | 77 | 89 | 84.5 |
| Flaky Graphite | 98% | 8 | 12 | 15 | 18 | 12 | 15 | 18 | 8 | 12 |
| Metal Al | Fine Powder | 2 | 2.5 | 3 | 3.5 | 2.5 | 3 | 3.5 | 2 | 2.5 |
| Metal Si | Fine Powder | 1 | 1 | 1 | 1.5 | 1 | 1 | 1.5 | 1 | 1 |
| Eco-friendly Binder | Molasses | 3 | 3 | 3 | 3 | 1.5 | 1.5 | 1.5 | — | — |
|  | Magnesium Sulfate (30 wt % in water) | — | — | — | — | 1.5 | 1.5 | 1.5 | 3 | 3 |
|  | Saccharified Starch (60 wt % in water) | — | — | — | — | — | — | — | — | — |
| Phenolic Resin | Liquid Resol | — | — | — | — | — | — | — | — | — |
| Properties after dry (200° C. × 24 hrs) | Bulk Density (g/cm3) | 3.06 | 3.01 | 2.98 | 2.95 | 3.01 | 2.97 | 2.93 | 3.05 | 2.95 |
|  | Apparent Porosity (%) | 4.3 | 3.5 | 3.3 | 3 | 3.6 | 3.3 | 3.1 | 4.1 | 5.8 |
|  | Cold Crushing Strength (Kg/cm2) | 485 | 362 | 333 | 298 | 351 | 305 | 269 | 474 | 296 |
| Properties after firing (1000° C. × 3 hrs) | Bulk Density (g/cm3) | 3.00 | 2.94 | 2.93 | 2.89 | 2.95 | 2.92 | 2.88 | 2.99 | 2.88 |
|  | Apparent Porosity (%) | 12.1 | 11.5 | 10.8 | 10.1 | 11.6 | 10.7 | 10.3 | 12.6 | 12.1 |
|  | Cold Crushing Strength (Kg/cm2) | 348 | 273 | 249 | 187 | 252 | 229 | 168 | 305 | 184 |
| Corrosion Resistance | Corrosion Index | 126 | 111 | 95 | 90 | 113 | 98 | 95 | 131 | 127 |

|  |  | Comparative Examples | | | | |
|---|---|---|---|---|---|---|
|  |  | 2-1 | 2-2 | 2-3 | 2-4 | 2-5 |
| Electrofused Magnesia | 5 to −0.074 mm | 84.5 | 81 | 77 | 84.5 | 81 |
| Flaky Graphite | 98% | 12 | 15 | 18 | 12 | 15 |
| Metal Al | Fine Powder | 2.5 | 3 | 3.5 | 2.5 | 3 |
| Metal Si | Fine Powder | 1 | 1 | 1.5 | 1 | 1 |
| Eco-friendly Binder | Molasses | — | — | — | — | — |
|  | Magnesium Sulfate (30 wt % in water) | — | — | — | — | — |
|  | Saccharified Starch (60 wt % in water) | — | — | — | 3 | 3 |
| Phenolic Resin | Liquid Resol | 3 | 3 | 3 | — | — |
| Properties after dry (200° C. × 24 hrs) | Bulk Density (g/cm3) | 3.00 | 2.97 | 2.95 | 3.00 | 2.98 |
|  | Apparent Porosity (%) | 2.9 | 2.5 | 2.3 | 3.6 | 3.2 |
|  | Cold Crushing Strength (Kg/cm2) | 375 | 341 | 309 | 357 | 318 |
| Properties after firing (1000° C. × 3 hrs) | Bulk Density (g/cm3) | 2.94 | 2.92 | 2.90 | 2.93 | 2.91 |
|  | Apparent Porosity (%) | 10.2 | 9.8 | 9.6 | 11.9 | 11.2 |
|  | Cold Crushing Strength (Kg/cm2) | 267 | 245 | 189 | 196 | 162 |
| Corrosion Resistance | Corrosion Index | 117 | 100 | 92 | 126 | 113 |

In Table 2, Examples 2-1 to 2-4 are directed to refractory compositions comprising molasses as the binder; Comparative Examples 2-1 to 2-3, refractory compositions comprising a phenolic resin; Examples 2-5 to 2-7, refractory compositions comprising a mixture of molasses with magnesium sulfate; Examples 2-8 and 2-9, refractory compositions comprising magnesium sulfate alone; and Comparative Examples 2-4 and 2-5, refractory compositions comprising saccharified starch.

As can be seen from Table 2, the inventive refractory compositions comprising molasses or a mixture of magnesium sulfate and molasses have corrosion resistance comparable to or better than those of the refractory compositions comprising the phenolic resin. The refractory compositions comprising saccharified starch show poor reduction-firing properties and corrosion resistance.

Examples 3-1 to 3-4 and Comparative Example 3-1

Various brick (MgO based) compositions were prepared as shown in Table 3.

Each brick composition was press-molded to obtain a brick specimen, which was subjected to the procedure of Examples 1-1 to 1-6. The test results are shown in Table 3.

From Table 3, it can be seen that the use of expanded graphite with flaky graphite provides refractory bricks having excellent thermal spalling resistance as well as corrosion resistance as compared to that comprising phenolic resin.

Examples 4-1 to 4-7 and Comparative Examples 4-1 and 4-2

Various brick compositions were prepared as shown in Table 4. Each brick composition was press-molded to obtain a brick specimen, which was subjected to the procedure of Examples 1-1 to 1-6. In these Examples, the binder components used are as follows:

A: Magnesium sulfate (20)+Lignosulphonate (40)+water (40)

B: Magnesium sulfate (20)+Molasses (10)+Lignosulphonate (30)+water (40)

C: Magnesium sulfate (50)+Methanol (50)

D: Magnesium sulfate (50)+Sorbitol (50)

TABLE 3

| | | Examples | | | | Comparative Example |
|---|---|---|---|---|---|---|
| | | 3-1 | 3-2 | 3-3 | 3-4 | 3-1 |
| Electrofused Magnesia | 5 to −0.074 mm | 84 | 84 | 84 | 84 | 84 |
| Flaky Graphite | 98% | 12 | 12 | 12 | 15 | 15 |
| Expanded Graphite | 98% | 3 | 3 | 3 | | |
| Metal Al | Fine Powder | 1 | 1 | 1 | 1 | 1 |
| Ecofriendly Binder | Molasses | 3 | 1.5 | 1 | 1 | |
| | Magnesium Sulfate (30 wt % in water) | | 1.5 | 2 | 2 | |
| Phenolic Resin | Liquid Resol | | | | | 3 |
| Corrosion Resistance | Corrosion Index | 96 | 100 | 99 | 103 | 106 |
| Thermal Spalling Resistance | | 11 | 10 | 10 | 8 | 8 |

E: Magnesium sulfate (30)+Lignosulphonate (30)+water (40)

The test results are shown in Table 4.

TABLE 4

| | | Examples | | | | | | | Comparative Examples | |
|---|---|---|---|---|---|---|---|---|---|---|
| | | 4-1 | 4-2 | 4-3 | 4-4 | 4-5 | 4-6 | 4-7 | 4-1 | 4-2 |
| Electrofused Magnesia | | 85 | 85 | 85 | 20 | 20 | 20 | 85 | 85 | 20 |
| Alumina | | — | — | — | 67 | 67 | 67 | — | — | 67 |
| Flaky Graphite | | 12 | 12 | 12 | 10 | 10 | 10 | 12 | 12 | 10 |
| Metal Al | | 2 | 2 | 2 | 2 | 2 | 2 | 2 | 2 | 2 |
| Metal Si | | 1 | 1 | 1 | 1 | 1 | 1 | 1 | 1 | 1 |
| Eco-friendly Binder | A | 3 | — | 2 | 3 | — | 2 | — | — | — |
| | B | — | 2 | — | — | 2 | — | — | — | — |
| | C | — | — | 1 | — | — | 1 | 1 | — | — |
| | D | — | 1 | — | — | 1 | — | — | — | — |
| | E | — | — | — | — | — | — | 2 | — | — |
| Phenolic Resin | Liquid Resol | — | — | — | — | — | — | — | 3 | 3 |
| Bulk Density (g/cm3) | | 3.01 | 3.01 | 3.02 | 3.16 | 3.15 | 3.16 | 3.02 | 3.01 | 3.15 |
| Cold Crushing Strength (kg/cm2) | | 370 | 365 | 375 | 481 | 479 | 485 | 378 | 369 | 473 |
| Apparent Porosity after Drying (%) | | 3.6 | 3.3 | 3.5 | 6.6 | 6.3 | 6.7 | 3.2 | 3.1 | 6.2 |
| Corrosion Index | | 98 | 98 | 96 | 133 | 132 | 129 | 95 | 100 | 135 |

From Table 4, it can be seen that the refractory compositions comprising various binder composition according to the present invention have the properties after drying and the corrosion resistance comparable to or better than those of the refractory compositions comprising the phenolic resin.

While the invention has been shown and described with respect to the preferred embodiment, it will be understood by those skilled in the art that various changes and modification may be made without departing from the spirit and scope of the invention as defined in the following claims.

The invention claimed is:

1. A carbon-containing refractory composition comprising a carbon-containing
refractory matrix material, and a binder, wherein the binder comprises up to 50% by weight saccharified starch or reduced saccharified starch and the remainder comprises 20 to 30% by weight of magnesium sulfate, 30 to 40% by weight of lignosulphonate and 40% by weight of water.

2. The carbon-containing refractory composition of claim 1, wherein the binder is employed in an amount ranging from 1 to 10% by weight based on the carbon-containing refractory matrix material.

3. The carbon-containing refractory composition of claim 1, wherein the saccharified starch or reduced saccharified starch is present in an amount of 20 to 50% by weight.

4. The carbon-containing refractory composition of claim 1, wherein the carbon-containing refractory matrix material further comprises expanded graphite or nanocarbon in an amount of 0.5 to 10% by weight based on the refractory matrix material.

5. A method of fabricating a carbon-containing refractory comprising press-molding the carbon-containing refractory composition according to claim 1, and drying and optionally reduction-firing the press-molded composition.

6. The method of claim 5, wherein the press-molded composition is dried at a temperature of 600° C. or less.

7. The method of claim 5, wherein the press-molded composition is dried at a temperature of 60 to 135° C. and fired at 1,000 to 1,500° C. under a reducing atmosphere.

8. An unfired or reduction-fired carbon-containing refractory fabricated from the method of claim 5.

* * * * *